United States Patent
Shepard et al.

(10) Patent No.: US 10,574,313 B2
(45) Date of Patent: Feb. 25, 2020

(54) TECHNIQUE FOR FULL-DUPLEX TRANSMISSION IN MANY-ANTENNA MU-MIMO SYSTEMS

(71) Applicant: Skylark Wireless, LLC, Houston, TX (US)

(72) Inventors: Clayton Wells Shepard, Houston, TX (US); Evan J. Everett, Houston, TX (US); Ashutosh Sabharwal, Houston, TX (US); Lin Zhong, Houston, TX (US)

(73) Assignee: Skylark WL Holdings, LLC, Houston, TX (US)

( * ) Notice: Subject to any disclaimer, the term of this patent is extended or adjusted under 35 U.S.C. 154(b) by 125 days.

(21) Appl. No.: 15/540,129

(22) PCT Filed: Apr. 23, 2016

(86) PCT No.: PCT/US2016/029076
§ 371 (c)(1),
(2) Date: Jun. 27, 2017

(87) PCT Pub. No.: WO2016/172651
PCT Pub. Date: Oct. 27, 2016

(65) Prior Publication Data
US 2018/0006690 A1     Jan. 4, 2018

Related U.S. Application Data

(60) Provisional application No. 62/152,544, filed on Apr. 24, 2015.

(51) Int. Cl.
*H04B 7/0456*    (2017.01)
*H04B 7/06*    (2006.01)
*H04B 7/0452*    (2017.01)

(52) U.S. Cl.
CPC ......... *H04B 7/0456* (2013.01); *H04B 7/0452* (2013.01); *H04B 7/0615* (2013.01)

(58) Field of Classification Search
None
See application file for complete search history.

(56) References Cited

U.S. PATENT DOCUMENTS 10,033,428 B2 *   7/2018   Liu ...................... H04B 1/525
10,439,755 B1 *   10/2019   Krunz .................. H04K 3/60
(Continued)

*Primary Examiner* — Steve R Young
(74) *Attorney, Agent, or Firm* — Kearney, McWilliams & Davis, PLLC; William C. Yarbrough

(57) ABSTRACT

Technique for full-duplex transmission in many-antenna multi-user (MU) multiple-input multiple-output (MIMO) systems is presented in this disclosure. An estimate of a self-interference channel between a plurality of transmit antennas and a plurality of receive antennas is first obtained. A precoder for self-interference reduction is generated based on minimizing a self-interference power related to the self-interference channel that is present at the plurality of receive antennas. Transmission data are modified using the precoder by projecting the transmission data onto a defined number of singular vectors of the self-interference channel that correspond to the defined number of smallest singular values of the self-interference channel. Data are received in full-duplex mode via the plurality of receive antennas simultaneously with transmitting the modified transmission data.

19 Claims, 16 Drawing Sheets

(56) References Cited

U.S. PATENT DOCUMENTS

| | | | |
|---|---|---|---|
| 2009/0323841 A1* | 12/2009 | Clerckx | H04B 7/0639 |
| | | | 375/260 |
| 2013/0034129 A1* | 2/2013 | Coldrey | H04B 7/15564 |
| | | | 375/211 |
| 2014/0369321 A1* | 12/2014 | Tan | H04W 56/001 |
| | | | 370/336 |
| 2015/0139347 A1* | 5/2015 | Murch | H04B 7/0456 |
| | | | 375/267 |
| 2016/0249245 A1* | 8/2016 | Kim | H04B 17/345 |
| 2017/0111164 A1* | 4/2017 | Wyville | H04B 1/525 |
| 2017/0294946 A1* | 10/2017 | Wang | H04B 7/0413 |

* cited by examiner

TECHNIQUE FOR FULL-DUPLEX TRANSMISSION IN MANY-ANTENNA MU-MIMO SYSTEMS

CROSS-REFERENCE TO RELATED APPLICATIONS

This application claims benefit of U.S. Provisional Patent Application Ser. No. 62/152,544, filed Apr. 24, 2015, which is hereby incorporated by reference in its entirety.

STATEMENT REGARDING FEDERALLY SPONSORED RESEARCH OR DEVELOPMENT

This invention was made in part with government support under grant numbers CNS0751173, CNS0923479, CNS1012831, CNS1126478, and CNS1218700 awarded by the National Science Foundation. The government has certain rights in the invention.

BACKGROUND

This disclosure generally relates to a method and apparatus for wireless communications, and more particularly relates to a technique for full-duplex transmission in many-antenna multi-user (MU) multiple-input multiple-output (MIMO) systems.

Full-duplex wireless communication, in which transmission and reception occur at the same time and in the same frequency band, has the potential to as much as double the spectral efficiency of traditional half-duplex systems. The main challenge to full-duplex communication is self-interference, i.e., a node's transmit signal generates high-powered interference to its own receiver. It has been shown that full-duplex operation may be feasible for small cells (e.g., small number of users), and the key enabler has been analog cancellation of the self-interference in addition to digital cancellation. Analog cancellation has been considered a necessary component of a full-duplex system, to avoid self-interference from overwhelming a dynamic range of receiver electronics, and swamping the much weaker intended signal.

Many analog cancellation designs have been proposed for single-antenna and dual-antenna full-duplex systems. However, current wireless base stations utilize many antennas (e.g., up to eight antennas, such as in Long Term Evolution (LTE) Release 12 based systems), and next-generation wireless communication systems will likely employ many more antennas at base stations. For example, discussions to include 64-antenna base stations have already been initiated in $3^{rd}$ Generation Partnership Project (3GPP) standardization, and "massive" antenna arrays with hundreds to thousands of antennas have also been proposed for $5^{th}$ generation (5G) wireless communication systems.

As the number of base-station antennas increases, an important question is how to enable full-duplex with a large number of antennas. Full-duplex multi-user multiple-input multiple-output (MU-MIMO) communications would enable the base station to transmit to multiple downlink users and receive from multiple uplink users, all at the same time and in the same frequency band. Full-duplex with many antennas presents both challenges and opportunities. The complexity of analog self-interference cancellation circuitry grows in proportion to the number of antennas. At the same time, many-antenna full-duplex also presents an opportunity: having many more antennas than users served means that more spatial resources become available for transmit beamforming to reduce self-interference.

SUMMARY

Disclosed embodiments include a method and apparatus for reducing self-interference at a many-antenna base station of a multi-user multiple-input multiple output (MU-MIMO) full-duplex wireless communication system. The method for self-interference reduction presented herein is based upon a digital precoder applied at a transmitter side of the many-antenna base station. The digital precoder is generated such that to minimize a self-interference power present at a plurality of receive antennas of the many-antenna base station or at a plurality of receive antennas of wireless device(s) interfering with the many-antenna base station. The digital precoder is applied to transmission data to generate a modified version of the transmission data to be transmitted via a plurality of transmit antennas of the many-antenna base station. The modified version of the transmission data represents a projection of the transmission data onto singular vectors of a self-interference channel between the transmit and receive antennas that correspond to smallest singular values of the self-interference channel, thus minimizing the self-interference between the transmit and receive antennas (i.e., the self-interference power at the receive antennas). While transmitting the modified transmission data projected onto the smallest singular values of the self-interference channel, data are received at the many-antenna base station or at the interfering wireless device(s) containing the minimized level of self-interference originating from the transmission data, thus achieving full-duplex communication with the minimized level of self-interference.

Figure 1:
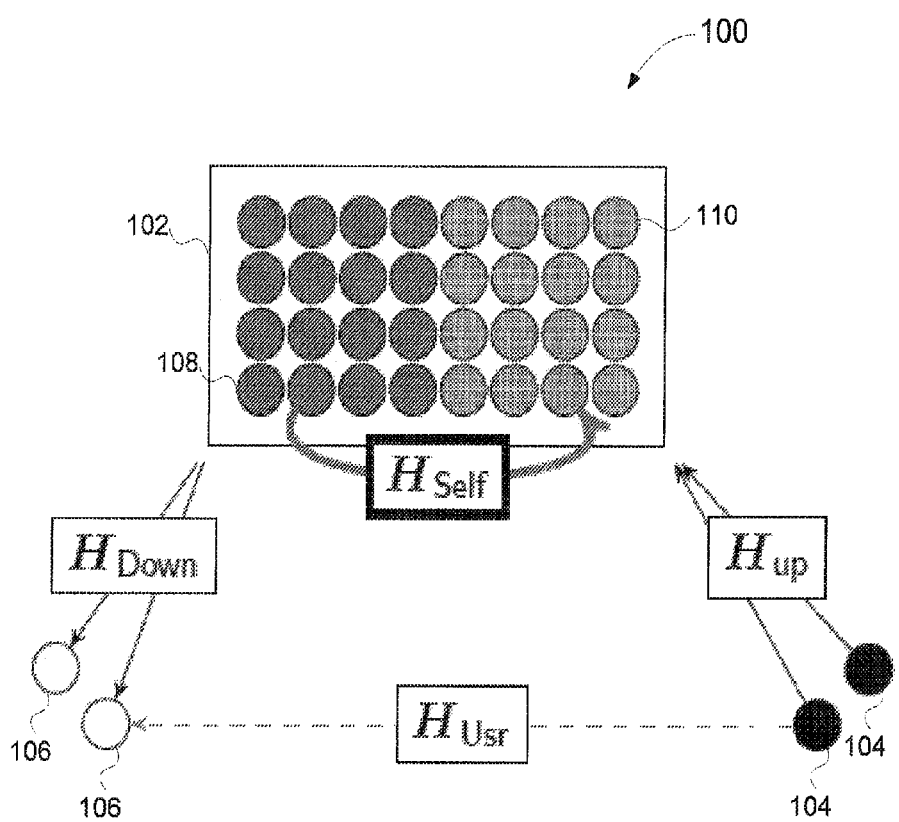
FIG. 1 is an example multi-user full-duplex wireless communication system, in accordance with embodiments of the present disclosure.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The techniques described herein may be used for various wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are created in the frequency domain with OFDM and in the time domain with SC-FDMA.

The teachings herein may be incorporated into (e.g., implemented within or performed by) a variety of wired or wireless apparatuses (e.g., nodes). In some embodiments, a node comprises a wireless node. Such wireless node may provide, for example, connectivity for or to a network (e.g., a wide area network such as the Internet or a cellular network) via a wired or wireless communication link. In some embodiments, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations, an access point may comprise a set top box kiosk, a media center, or any other suitable device that is configured to communicate via a wireless or wired medium. According to certain embodiments of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain embodiments of the present disclosure, the access terminal may operate in accordance with the IEEE 802.11 family of wireless communications standards.

Described embodiments include an all-digital method for self-interference reduction to enable full-duplex operation in many-antenna multi-user multiple-input multiple-output (MU-MIMO) wireless communication systems that employ base stations (or access points) with a large number of antennas (e.g., many-antenna base stations). Unlike most designs that rely on analog cancellers to suppress self-interference, the methods presented herein use digital transmit beamforming to reduce self-interference, providing cost efficient implementation, lower power consumption and more efficient mitigation of self-interference in comparison with analog-based approach. The described methods reduce self-interference to prevent exciding a dynamic range of a receiver portion of a many-antenna base station due to a high level of undesired received signal which prevents accurate operation of the base station's receiver. A level of self-interference that is not completely suppressed at a base station's transmitter and is present at the receiver (i.e., residual self-interference at the receiver) is then cancelled digitally by a digital cancellation unit implemented at the receiver portion of the many-antenna base station, as described in more detail below.

The performance of the described methods for self-interference reduction can be evaluated using measurements from, for example, a 72-element antenna array in both indoor and outdoor environments. The described methods for self-interference reduction employed in full-duplex systems can significantly outperform half-duplex systems operating in the many-antenna regime, where a number of antennas used at a base station is much larger than a number of users being served simultaneously by the base station.

Described embodiments relate to many-antenna full-duplex operation with current radio hardware that can either send or receive on the same band but not both, i.e., Time Division Duplex (TDD) radios without analog cancellation can be employed. An all-digital approach for self-interference reduction is presented in this disclosure to enable many-antenna full-duplex communication. In the designs presented herein, an array of base station antennas can be partitioned into a set of transmit antennas and a set of receive antennas, and self-interference from the transmit antennas to the receive antennas can be reduced by transmit beamforming. The methods presented herein can operate on the output of algorithms for downlink MU-MIMO (e.g., zero-forcing beamforming) without modifying their operation. In some embodiments, the receive antennas are not part of the base station, but may be located at one or more wireless devices that interfere with the base station. Therefore, the described methods for self-interference reduction can be implemented to mitigate a self-interference power at the one or more wireless devices interfering with the base station.

The described methods aim to reduce self-interference at a transmitter side of the many-antenna base station to a desired level. The reduced level of self-interference at the transmitter leads to a reduced level of self-interference at a receiver side which helps avoiding saturation of an analog-to-digital conversion at the receive radio chain with a prohibitively high level of receive signal (comprising a desired signal and a residual self-interference from the transmitter), which ensures accurate operation at the receiver.

In some embodiments, the precoder for self-interference reduction presented herein and applied at a downlink of a many-antenna base station can minimize a total self-interference power, given a constraint on how many effective antennas (i.e., transmit degrees of freedom) must be preserved. The term "effective antennas" represents a number of dimensions available to a physical layer of the many-antenna base station for downlink communication (e.g., $D_{Tx}$ dimensions or effective antennas). The presented precoder configured to minimize the total self-interference has an intuitive form, i.e., the precoder for self-interference reduction represents a projection onto singular vectors of a self-interference channel corresponding to $D_{Tx}$ smallest singular values.

The described methods for self-interference suppression enable a large reduction in self-interference while sacrificing relatively few effective antennas (i.e., dimensions for downlink transmission). It is also shown in illustrative embodiments of the present disclosure that the presented self-interference suppression method can provide significant rate gains over half-duplex systems in the case when a number of transmit antennas at a many-antenna base station is much larger than a number of users being served by the many-antenna base station.

FIG. 1 illustrates an example multi-user full-duplex wireless communication system 100, in accordance with embodiments of the present disclosure. A base station (or access point) 102 may communicate with $K_{Up}$ uplink users (or uplink access terminals) 104 and $K_{Down}$ downlink users (or downlink access terminals) 106. The base station 102 may be equipped with M antennas 108, 110. The base station 102 may use traditional radios, i.e., each of the M antennas can both transmit and receive, but a given antenna cannot both transmit and receive at the same time. Therefore, in full-duplex operation, $M_{Tx}$ of the antennas (e.g., antennas 108) transmit while $M_{Rx}$ antennas (e.g., antennas 110) receive, with the requirement that $M_{Tx}+M_{Rx} \leq M$. It should be noted that choice of which antennas 108, 110 transmit and receive can be adaptively chosen by a scheduler (e.g., network scheduler, not shown in FIG. 1). On the other hand, in half-duplex mode, all antennas 108, 110 are used for either transmission or reception, i.e., $M_{Tx}=M_{Rx}=M$. The vector of symbols transmitted by the base station 102 is $x_{Down} \in C^{M_{Tx}}$, and the vector of symbols transmitted by the users 104 is $x_{Up} \in C^{K_{Up}}$.

For some embodiments, the signal received at the base station 102 may be given as:

$$y_{Up} = H_{Up} x_{Up} + H_{Self} x_{Down} + z_{Up}, \qquad (1)$$

where $H_{Up} \in C^{M_{Rx} \times K_{Up}}$ is the uplink channel matrix, $H_{Self} \in C^{M_{Rx} \times M_{Tx}}$ is the self-interference channel matrix, and $z_{Up} \in C^{M_{Rx}}$ is the noise at the base station's receiver. The signal received by the $K_{Down}$ downlink users 106 may be given as:

$$y_{Down} = H_{Down} x_{Down} + H_{Usr} x_{Up} + z_{Down} \qquad (2)$$

where $H_{Down} \in C^{K_{Down} \times M_{Tx}}$ is the downlink channel matrix, $H_{Usr} \in C^{K_{Down} \times K_{Up}}$ is the matrix of channel coefficients from the uplink users 104 to the downlink users 106, and $z_{Down} \in C^{K_{Down}}$ is the noise at the receiver of each user 106.

Described embodiments focus on the challenge of self-interference suppression. It is generally considered in the present disclosure that $H_{Usr}=0$. In half-duplex operation, equations (1) and (2) can be simplified, i.e., the self-interference term can be eliminated in equation (1), and $H_{Up}$ is a $M \times K_{Up}$ matrix and $K_{Down}$ is a $K_{Down} \times M$ Matrix. The signaling challenge unique to full-duplex operations is how to design $x_{Down}$ (i.e., the vector of symbols transmitted by the base station 102) such that the self-interference is below a defined threshold, while still providing a high signal-to-interference-plus-noise ratio (SINR) to the downlink users 106.

Precoder Design

Figure 2:
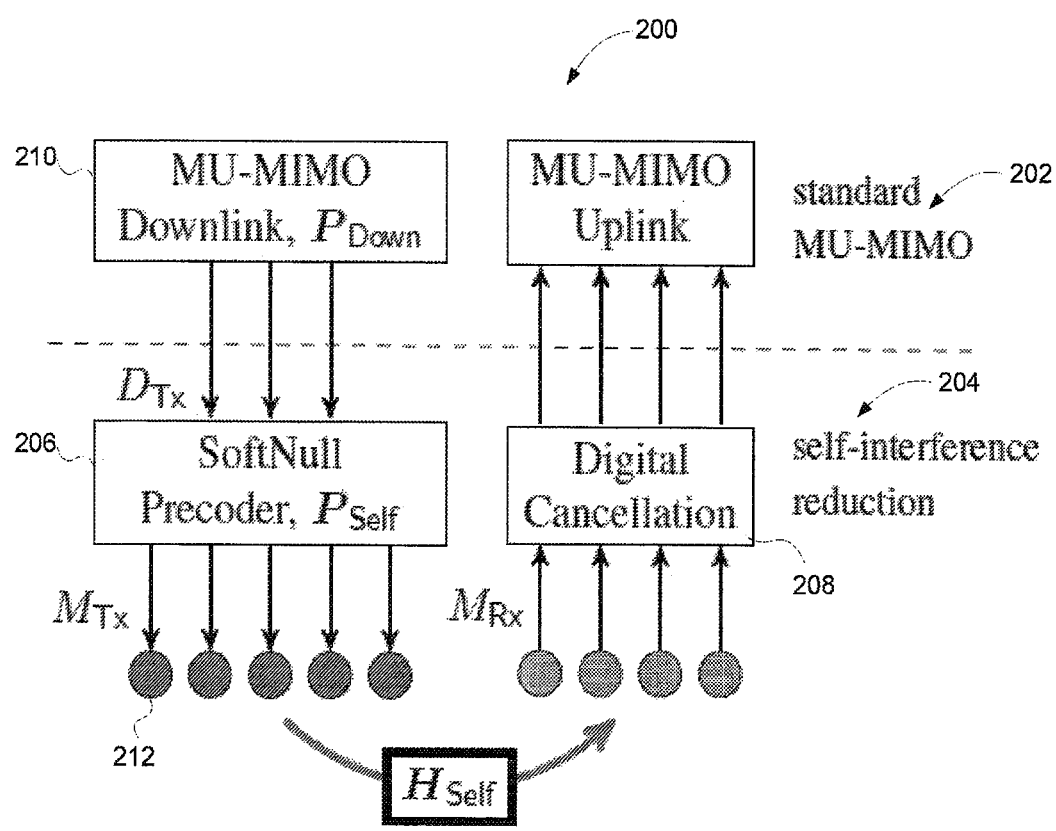
FIG. 2 is an example block diagram of self-interference reduction that may be implemented at a many-antenna base station of a multi-user full-duplex wireless communication system, in accordance with embodiments of the present disclosure.

FIG. 2 illustrates an example block diagram 200 of self-interference reduction in a multi-user full-duplex wireless communication system based on a transmit precoder design, in accordance with embodiments of the present disclosure. The self-interference reduction illustrated in FIG. 2 may be implemented at the many-antenna base station 102 of the multi-user full-duplex wireless communication system 100 illustrated in FIG. 1. As illustrated in FIG. 2, a two-stage approach is applied for self-interference reduction. A first stage 202 represents standard MU-MEMO for which conventional precoding and equalization algorithms can be employed. A second stage 204 represents the self-interference reduction stage, which reduces self-interference via transmit beamforming at a transmit side and digital self-interference cancellation at a receive side. The advantage of the two-stage approach illustrated in FIG. 2 is that the presented precoder for self-interference reduction can be incorporated as a modular addition to existing MU-MIMO systems.

As illustrated in FIG. 2, the self-interference reduction stage 204 may comprise two components: a transmitter-side precoder 206 configured to reduce self-interference and a receiver-side digital canceller 208 configured to reduce a remaining level of self-interference (i.e., residual self-interference). In some embodiments, the decision on the partitioning of transmit and receive antennas ($M_{Tx}$, $M_{Rx}$) at the employed many-antenna base station can be made by a higher layer operation, e.g., based on the network needs.

As illustrated in FIG. 2, the downlink precoding may comprise two stages, a MU-MIMO downlink precoder 210, $P_{Down}$, followed by the self-interference reduction precoder

206, $P_{Self}$. The goal of the precoder 206, $P_{Self}$ is to suppress self-interference. The goal of the downlink precoder 210, $P_{Down}$, is for the signal received by each user to contain mostly the signal intended for that user, and as low as possible signals intended for other users. The MU-MIMO downlink precoder 210, $P_{Down}$, may control a number of $D_{Tx}$ effective transmit antennas. The self-interference reduction precoder 206, $P_{Self}$ maps the signal on the $D_{Tx}$ effective antennas (provided by the downlink precoder 210) to the signal transmitted on the $M_{Tx}$ physical transmit antennas 212, as illustrated in FIG. 2.

Let $s_{Down} \in C^{K_{Down}}$ denote the vector of symbols that a many-antenna base station (e.g., the many-antenna base station 102 illustrated in FIG. 1) allocates for communication to each of the $K_{Down}$ downlink users. In one or more embodiments, both the MU-MIMO stage 202 and the self-interference reduction stage 204 can be constrained to be linear, such that $P_{Down}$ is a $D_{Tx} \times K_{Down}$ complex-valued matrix and $P_{Self}$ is a $M_{Tx} \times D_{Tx}$ matrix. The signal transmitted on the base station antennas may be then defined as $x_{Down} = P_{Self} P_{Down} s_{Down}$.

For some embodiments, the MU-MIMO downlink precoder 210, $P_{Down}$, does not need to have knowledge of both the self-interference channel $H_{Self}$ and the downlink channel $H_{Down}$. Instead, the MU-MIMO downlink precoder 210, $P_{Down}$, only needs to know the effective downlink channel, $H_{Eff} = H_{Down} P_{Self}$ which is created by the self-interference reduction precoder 206, $P_{Self}$ operating on the physical downlink channel $H_{Down}$. In one or more embodiments, the effective downlink channel $H_{Eff}$ can be estimated directly by transmitting/receiving pilots along the $D_{Tx}$ effective antennas. For the MU-MIMO downlink precoder 210, $P_{Down}$, algorithms such as minimum mean square error (MMSE) based beamforming, zero-forcing beamforming or matched filtering can be employed. For example, in the case of zero-forcing beamforming, the MU-MIMO downlink precoder 210, $P_{Down}$, can be defined as the Moore-Penrose (right) pseudoinverse of the effective downlink channel $H_{Eff}$, i.e., $$P_{Down} = P_{Down}^{(ZFBF)} = \alpha^{(ZEBF)} H_{Eff}^H (H_{Eff} H_{Eff}^H)^{-1} \qquad (3)$$

where $\alpha^{(ZEBF)}$ is a power constraint coefficient.

In accordance with embodiments of the present disclosure, the goal of the self-interference reduction precoder 206, $P_{Self}$ is to reduce self-interference while preserving a required number of effective antennas, $D_{Tx}$, for MU-MIMO downlink transmission. As illustrated in FIG. 2, the self-interference reduction precoder 206, $P_{Self}$ has $D_{Tx}$ inputs as effective antennas, and $M_{Tx}$ outputs to the physical transmit antennas 212. In one or more embodiments, the self-interference reduction precoder 206, $P_{Self}$ is provided with information related to the self-interference channel, $H_{Self}$, such as estimation coefficients of the self-interference channel matrix, $H_{Self}$. The goal is to minimize the total self-interference power while maintaining $D_{Tx}$ effective antennas. The choice of minimizing total self-interference, rather than choosing a per-antenna metric is twofold. First, minimizing the total self-interference gives more freedom in designing the self-interference reduction precoder 206, $P_{Self}$. Instead of creating nulls to reduce self-interference at specific antennas, the self-interference reduction precoder 206, $P_{Self}$ can optimize placement of nulls such that each null can reduce self-interference to multiple receive antennas. Second, minimizing the total self-interference power leads to a closed-form solution, which can be efficiently implemented with full arithmetic precision and accuracy. In some embodiments, the design problem for the self-interference reduction precoder 206, $P_{Self}$ may be formulated as:

$$P_{Self} = \underset{P}{\operatorname{argmin}} \|H_{Self} P\|_F^2 \qquad (4)$$

subject to $P^H P = I_{D_{Tx} \times D_{Tx}}$.

For some embodiments, the squared Frobenius norm in equation (4), $\|\cdot\|_F^2$, measures the total self-interference power. The constraint, $P^H P = I_{D_{Tx} \times D_{Tx}}$, forces the self-interference reduction precoder 206, $P_{Self}$ to have $D_{Tx}$ orthonormal columns, and hence ensures that $D_{Tx}$ effective antennas are preserved for MU-MIMO downlink signaling. The optimization problem given by equation (4) has the closed-form intuitive solution. The preferred self-interference reduction precoder 206, $P_{Self}$ can be constructed by projecting onto the $D_{Tx}$ left singular vectors of the self-interference channel corresponding to the smallest $D_{Tx}$ singular values. Precisely, in some embodiments, the self-interference reduction precoder 206, $P_{Self}$ may be defined as:

$$P_{Self} = [v^{(M_{Tx} - D_{Tx} + 1)}, v^{(M_{Tx} - D_{Tx} + 2)}, \ldots, v^{(M_{Tx})}], \qquad (5)$$

where $H_{Self} = U \Sigma V^H$ is the singular value decomposition of the self-interference channel, U and V are unitary matrices (i.e., matrices of left and right eigenvectors, respectively), $\Sigma$ is a nonnegative diagonal matrix whose diagonal elements are the ordered singular values (i.e., matrix of eigenvalues) and $v^{(i)}$ is the i-th column (i.e., i-th eigenvector) of the matrix V. Essentially, the self-interference reduction precoder 206, $P_{Self}$ represents determining the $D_{Tx}$-dimensional subspace of the original transmit space, $C^{M_{Tx}}$, which presents the least amount of self-interference to the receiver.

Coefficients of the self-interference channel, $H_{Self}$ can be estimated based on a full channel estimation between every transmit antenna and every receive antenna. The full channel estimation can be implemented by sending pilots from the transmit antennas, receiving the pilots on the receive antennas, and estimating the channel coefficients based on the received pilots at each receive antenna. In some embodiments, as discussed, the receive antennas may belong to one or more interfering receivers separate from the many-antenna base station. In an embodiment, the receivers can be controlled by a network associated with the many-antenna base station. Thus, the receive antennas of the one or more receivers can be set to overhear the pilots transmitted from the transmit antennas of the many-antenna base station, and can be treated as the receive antennas of the many-antenna base station. In another embodiment, the one or more receivers interfering with the many-antenna base station are not controlled by the network or the many-antenna base station. In this case, the transmit antennas of the many-antenna base station would switch to a receive mode of operation and listen for one or more signals transmitted from one or more wireless devices comprising the receivers interfering with the many-antenna base station. Coefficients of the self-interference channel, $H_{Self}$ between the transmit antennas of the many-antenna base station and the one or more interfering wireless devices can be estimated based on the one or more signals received at the many-antenna base station. The described methods for self-interference reduction can be implemented to mitigate self-interference between the transmit antennas of the many-antenna base station and the one or more receivers separate from the many-antenna base station that can overhear signals transmitted from the many-antenna base station.

Figure 3A:
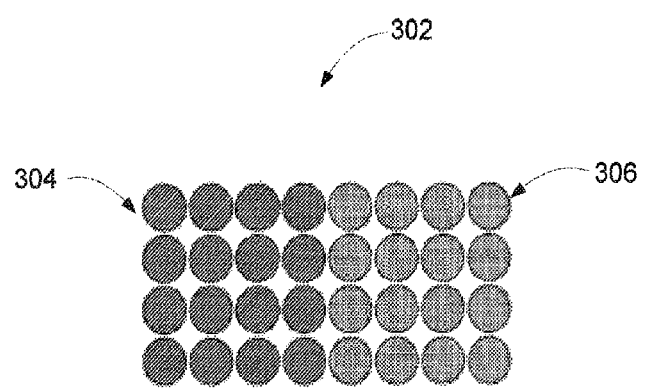
FIGS. 3A, 3B and 3C illustrate operation of a precoder for self-interference reduction implemented at the many-antenna base station illustrated in FIG. 2 in a multi-user full-duplex wireless communication system, in accordance with embodiments of the present disclosure.

The illustrative embodiment presented in this disclosure illustrates how the designed self-interference reduction precoder 206, $P_{Self}$ reduces self-interference by sacrificing effective transmit antennas. FIG. 3A illustrates a 4×8 (M=32) planar antenna array 302 that may be employed at a many-antenna base station. For example, the space between adjacent antennas can be half a wavelength. An even $(M_{Tx}, M_{Rx})=(16,16)$ division of transmit and receive antennas is considered. The antenna array 302 can be, for example, partitioned via an East-West partitioning, i.e., with 4×4 transmit sub-array 304 to the West, and 4×4 receive sub-array 306 to the East, as illustrated in FIG. 3A. For simplicity, it is considered that the antennas are point sources in free space, which enables computation of the electric field at any point in space via the free-space Green's function. In the illustrative embodiment, the channel between antenna m and point in space n may be defined as:

$$[H_{Self}]_{nm} = \frac{e^{jkr_{nm}}}{r_{nm}}, \quad (6)$$

where $r_{nm}$ is a distance between antenna m and point n, $$k = \frac{2\pi}{\lambda}$$

is a wavenumber, and $j=\sqrt{-1}$.

Figure 3B:
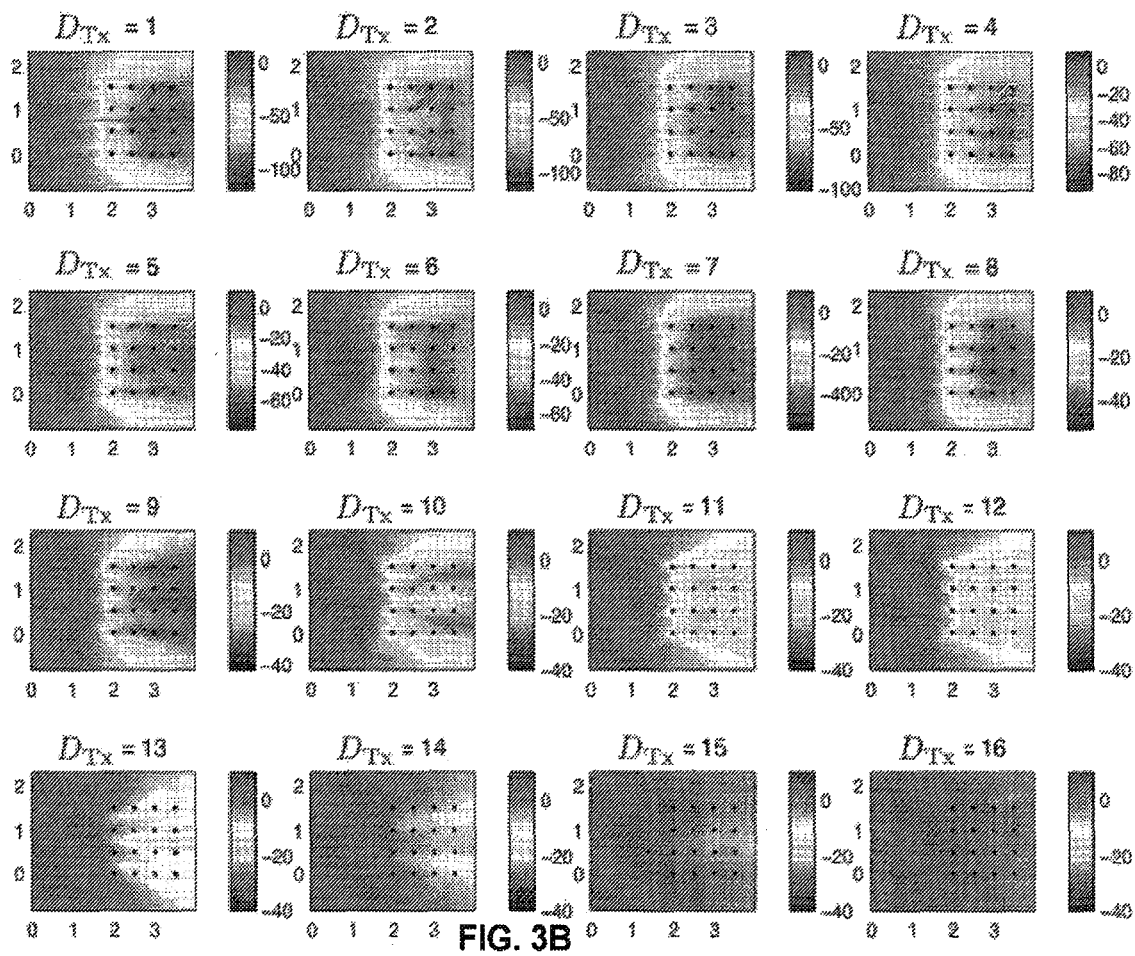

FIG. 3B illustrates the radiated field distribution, in the vicinity of the received antennas 306, as a function of the number of effective transmit antennas, $D_{Tx}$. First, it can be considered the case where $D_{Tx}=16=M_{Tx}$, in which no effective antennas are given up for the sake of self-interference reduction; it can be observed that all the receive antennas 306 receive very high level of self-interference. Then, in the case where $D_{Tx}=15$, and a single effective antenna is given up for self-interference reduction, the self-interference reduction precoder 206, $P_{Self}$ essentially steers a single "soft" null directly into the middle of the receive array 306. In the case of $D_{Tx}=14$, the two effective antennas are sacrificed allowing the self-interference reduction precoder 206, $P_{Self}$ to create two soft nulls that together cover a larger portion of the receive array 306. As illustrated in FIG. 3B, the trend continues, i.e., as more effective antennas $D_{Tx}$ are given up for the sake of self-interference reduction (i.e., the number of effective transmit antennas, $D_{Tx}$ is smaller), the self-interference reduction precoder 206, $P_{Self}$ can have more freedom for creation of a radiated field pattern with a small level of self-interference.

Figure 3C:
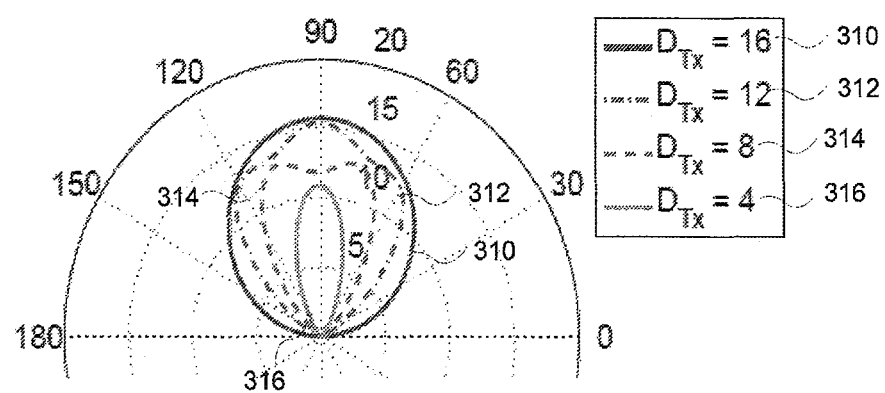

FIG. 3C illustrates the downside of sacrificing more effective transmit antennas for self-interference suppression, i.e., reduced transmit gain. FIG. 3C shows the far field power gain (e.g., relative to isotropic) that the transmit antenna array 304 can produce in each direction along the azimuth plane. The considered antenna elements are those that are circular patch antennas. In the case of the full system, i.e., $D_{Tx}=16=M_{Tx}$, a gain of 16 can be achieved at broadside (e.g., the gain 310). As illustrated in FIG. 3C, the gain may slowly decay as the direction falls away from broadside due to the individual patch elements having maximum gain at broadside. As more effective transmit antennas are given up for the sake of self-interference reduction, the maximum gain in any direction is reduced (e.g., see gains 312, 314 and 316 in FIG. 3C for $D_{Tx}=12$, $D_{Tx}=8$ and $D_{Tx}=4$, respectively).

Figure 4:
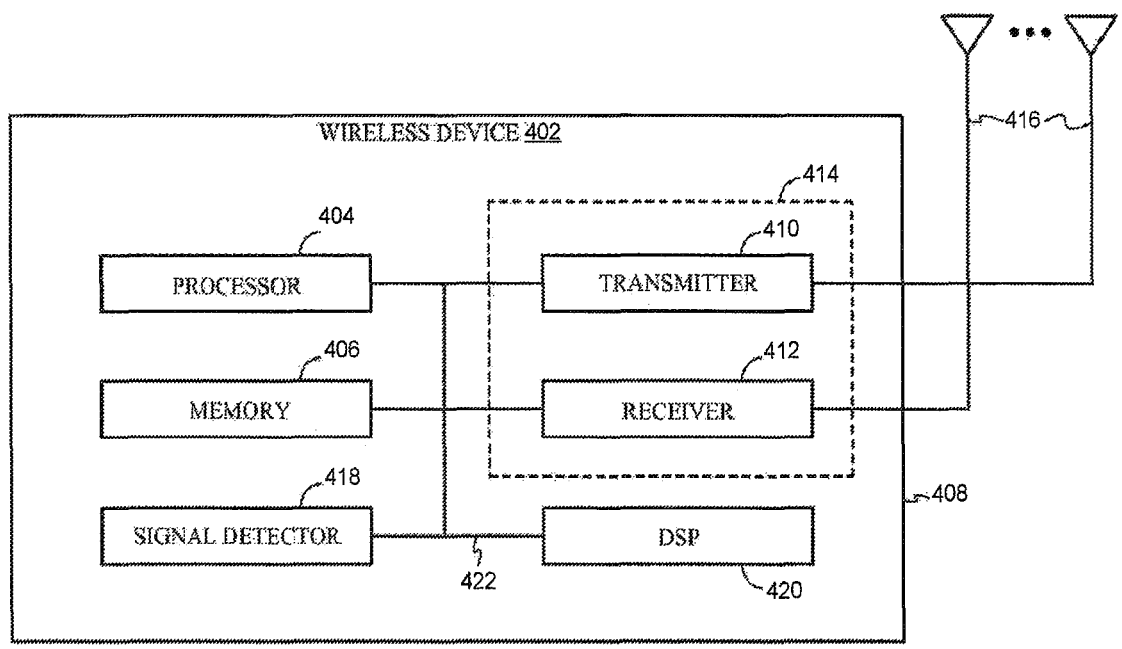
FIG. 4 is a block diagram of an example wireless device that may be employed in a full-duplex wireless communication system, in accordance with embodiments of the present disclosure.

FIG. 4 illustrates various components that may be utilized in a wireless device 402 that may be employed within the full-duplex wireless communication system 100 illustrated in FIG. 1. The wireless device 402 is an example of a device that may be configured to implement the various methods described herein. The wireless device 402 may be a many-antenna base station (access point) 102, an uplink user terminal 104, or a downlink user terminal 106.

The wireless device 402 may include a processor 404 which controls operation of the wireless device 402. The processor 404 may also be referred to as a central processing unit (CPU). Memory 406, which may include both read-only memory (ROM) and random access memory (RAM), provides instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The wireless device 402 may also include a housing 408 that may include a transmitter 410 and a receiver 412 to allow transmission and reception of data between the wireless device 402 and another wireless node (e.g., another wireless node in a remote location). The transmitter 410 and receiver 412 may be combined into a transceiver 414. One or more antennas 416 may be attached to the housing 408 and electrically coupled to the transceiver 414. The wireless device 402 may also include (not shown) multiple transmitters, multiple receivers, and multiple transceivers.

The wireless device 402 may also include a signal detector 418 that may detect and quantify the level of signals received by the transceiver 414. The signal detector 418 may quantify detection of such signals using total energy, energy per subcarrier per symbol, power spectral density and/or other quantification metrics. The wireless device 402 may also include a digital signal processor (DSP) 420 for use in processing signals.

The various components of the wireless device 402 may be coupled by a bus system 422, which may include a power bus, a control signal bus, and a status signal bus in addition to a data bus.

Antenna Array Partitioning

Disclosed embodiments include methods for designing a preferred precoder for self-interference suppression in full-duplex many-antenna MU-MIMO systems for a given $M_{Rx} \times M_{Tx}$ self-interference channel, i.e., the self-interference reduction precoder 206, $P_{Self}$ illustrated in FIG. 2 and defined by equations (4) and (5). Disclosed embodiments further include methods for partitioning an array of M antennas at a many-antenna base station (e.g., the many-antenna base station 102 illustrated in FIG. 1 that employs the self-interference reduction precoder 206, $P_{Self}$) into a sub-array of $M_{Tx}$ transmit antennas and a sub-array of $M_{Rx}$ receive antennas. Due to the combinatorial nature of the problem, finding the optimal antenna sets can be computationally difficult. For example, if M=72 and $M_{Tx}=36$, then there are $$\binom{72}{36} \approx 4.4 \times 10^{20}$$

possible combinations of transmit antenna sub-arrays. Because of that, empirical insights are employed herein that use traces collected via channel measurements to evaluate and compare several heuristic choices for partitioning the antenna array at the many-antenna base station.

Disclosed embodiments include methods for heuristic partitioning of the antenna array at a many-antenna base station. Intuitively, it can be recognized that the self-interference reduction precoder 206, $P_{Self}$ may have preferred performance when a power in the self-interference channel $H_{Self}$ is concentrated within a fewer number of eigen channels. It has been demonstrated both analytically and experimentally that as the spread of the angles-of-departure from a transmitter (e.g., transmit sub-array) to a receiver (e.g., receive sub-array) is decreased, a signal received at each receive antenna becomes more correlated. More correlated received signals may further cause the first few eigenvalues to become more dominant, which is desirable for the self-interference reduction precoder 206, $P_{Self}$.

Contiguous linear partitions of the antenna array (i.e., one side transmit sub-array, other side receive sub-array) limit an angular spread of angles-of-departure to/from the transmitter to the receiver, since all the interference is coming from only one "side" of the antenna array. For example, in the North-South antenna partition illustrated in FIG. 5B (i.e., transmit sub-array is at North, receive sub-array is at South), the angular spread of angles-of-arrival is less than 180 degrees for all receive antennas, since all interference is coming from the "North" (i.e., from the transmit sub-array).

Figure 5A:
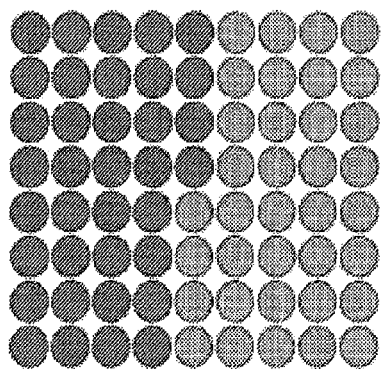
FIGS. 5A, 5B, 5C and 5D illustrate examples of transmit/receive antenna partitions at a base station in a multi-user full-duplex wireless communication system, in accordance with embodiments of the present disclosure.
Figure 5B:
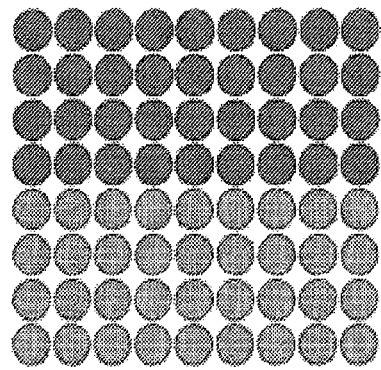
Figure 5C:
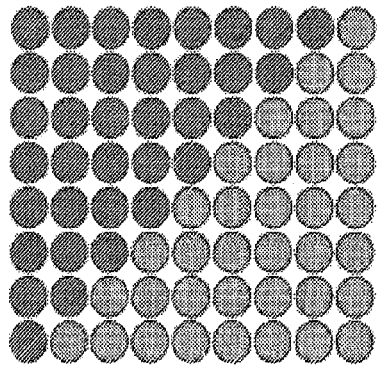
Figure 5D:
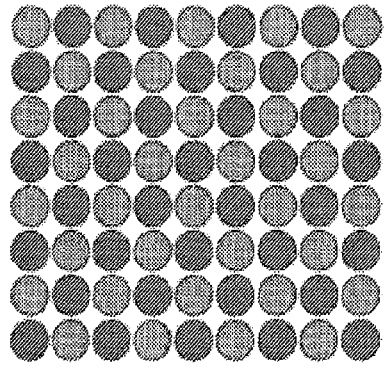

FIGS. 5A-5C show several antenna partitions at a many-antenna base station based on the above heuristic of linear contiguous partitioning in order to limit the angular spread: i.e., East-West, North-South, and Northwest-Southwest partitions are shown in FIG. 5A, FIG. 5B, and FIG. 5C, respectively. An even split between the number of transmit and receive antennas is considered for all antenna partitions. As a comparison, the interleaved partition shown in FIG. 5D is also considered. If the heuristic of minimizing angular spread is effective, then it would be expected that the interleaved partition is a near worst-case partition. In the interleaved partition, receive antennas experience interference arriving at every possible angle. In addition to the deterministic interleaved partition, the comparison is also made against the average measured performance of 10,000 randomly chosen partitions.

Figure 6:
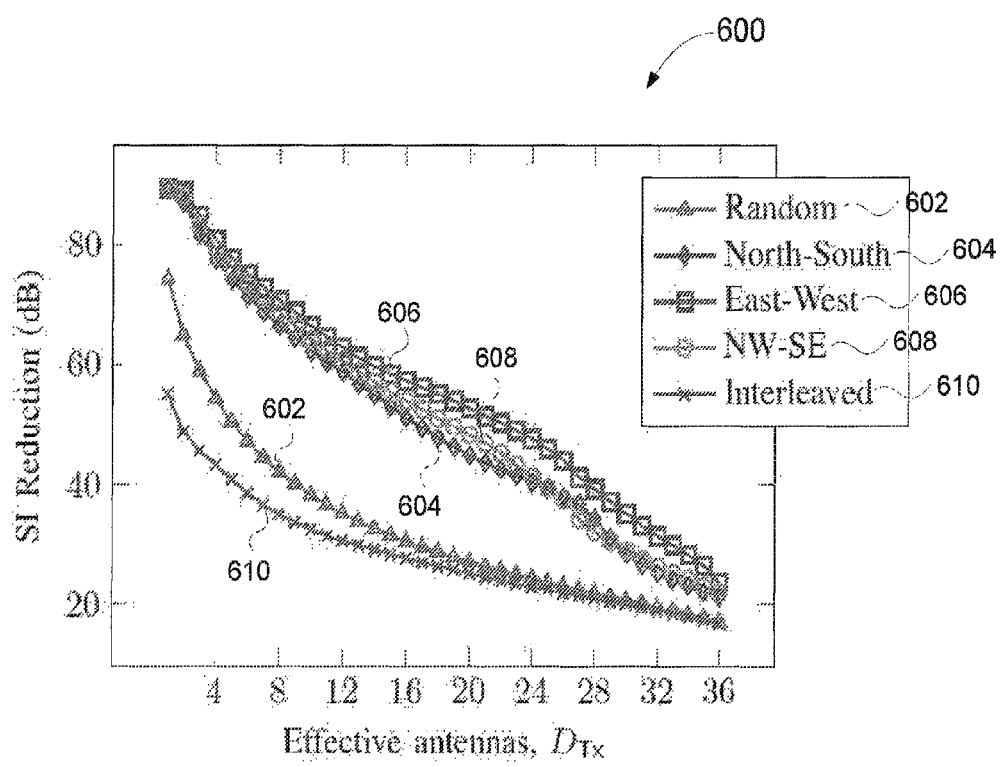
FIG. 6 is a graph illustrating self-interference reduction for different partitioning of antenna array at a base station in a multi-user full-duplex wireless communication system, in accordance with embodiments of the present disclosure.

To assess the performance of these heuristics, the self-interference channel response is directly measured in an anechoic chamber using the 72-element rectangular array and a $(M_{Tx}, M_{Rx})=(36,36)$ partition of transmit and receive antenna elements. The self-interference channel measurements are performed in the anechoic chamber, as this is the most repeatable scenario. FIG. 6 illustrates a graph 600 showing the tradeoff between self-interference reduction and a number of effective transmit antennas, $D_{Tx}$ for different antenna partitioning. As the number of effective transmit antennas, $D_{Tx}$ decreases from its maximum value of $D_{Tx}=M_{Tx}=36$, the amount of self-interference reduction achieved by the self-interference reduction precoder 206, $P_{Self}$ improves. Since $D_{Tx}$ is the number of effective antennas preserved for downlink signaling, $(M_{Tx}-D_{Tx})$ is the number of effective antennas leveraged for self-interference reduction. As the number of effective transmit antennas, $D_{Tx}$ decreases, more effective antennas are "given up" for the sake of improved self-interference reduction. Therefore, as the number of effective transmit antennas, $D_{Tx}$ decreases, it can be observed from FIG. 6 an improved self-interference reduction. It can be also observed in FIG. 6 that the tradeoff achieved for the contiguous partitions (e.g., plots 604, 606, 608 in FIG. 6 for the antenna partitions illustrated in FIGS. 5B, 5A, 5C, respectively) is much better than that achieved for the random antenna partition (e.g., plot 602 in FIG. 6) and interleaved partitions (e.g., plot 610 in FIG. 6 for the antenna partition illustrated in FIG. 5D).

Typical analog cancellation circuits may provide 40-50 dB self-interference reduction. Therefore, an interesting point of observation in FIG. 6 is how many effective antennas can be preserved while achieving more than 50 dB self-interference reduction similar to that of an analog canceller. For the random partition (e.g., plot 502), only 6 of the maximum 36 effective antennas can be preserved while achieving >50 dB self-interference reduction. However, for all of the contiguous antenna partitions, it can be possible to achieve >50 dB self-interference reduction with at least 16 effective antennas preserved for downlink signaling (see plots 604, 606 and 608 in FIG. 6).

It can be also observed in FIG. 6 that the antenna partition providing the preferred performance is the East-West partition (see plot 606 in FIG. 6), i.e., the antenna partition illustrated in FIG. 5A. This finding is in line with the heuristic: among the considered antenna partitions, the East-West antenna partition is the one with minimum angular spread between the transmit and receive partitions, since the East-West partition splits the antenna array along its smallest dimension (antenna array is wider than tall). It can be further observed from FIG. 6 that the interleaved antenna partition (e.g., plot 610) performs even worse than the average of random antenna partitions (e.g., plot 602), emphasizing the importance of selecting contiguous partitions. It should be also noted the large impact of the antenna partition type on the tradeoff between self-interference reduction and the number of effective transmit antennas, $D_{Tx}$. For $D_{Tx} \in [3,22]$, the East-West partition enables the designed self-interference reduction precoder 206, $P_{Self}$ to achieve more than 25 dB better self-interference reduction than an average of antenna partitions chosen at random.

Self-Interference Reduction in Different Scattering Environments

Figure 7A:
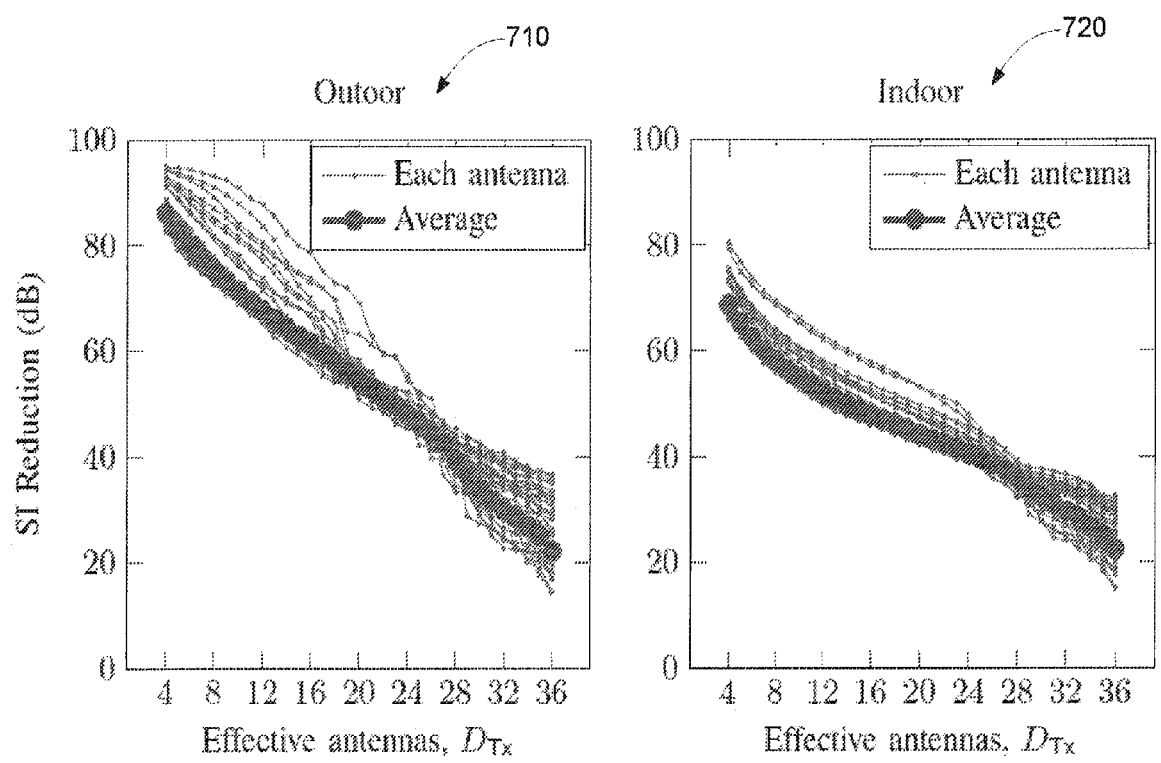
FIGS. 7A-7B illustrate example graphs of self-interference reduction achieved by a precoder for self-interference reduction in a multi-user full-duplex wireless communication system, in accordance with embodiments of the present disclosure.
Figure 7B:
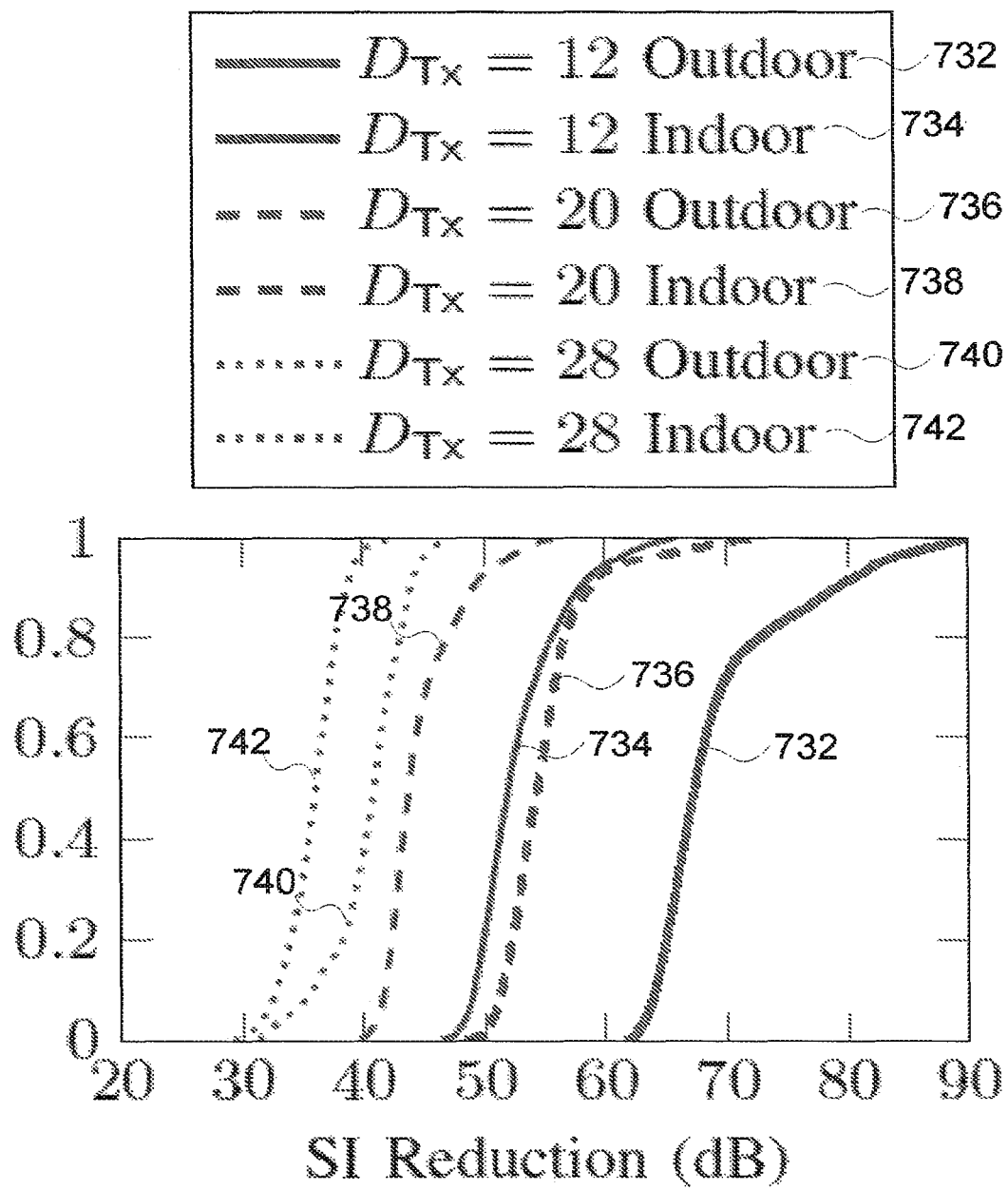

The scattering environment can have a significant impact on the performance of the self-interference reduction precoder 206, $P_{Self}$ illustrated in FIG. 2 and defined by equations (4) and (5). The collected traces can be used in the illustrative embodiment to study how the scattering environment impacts the tradeoff between self-interference reduction and effective antennas achieved by the self-interference reduction precoder 206, $P_{Self}$. For example, the 72-element antenna array can be utilized, with $(M_{Tx}, M_{Rx})=(36,36)$, East-West partition of transmit and receive elements, as illustrated in FIG. 5A. FIG. 7A compares the tradeoff between a level of self-interference reduction and a number of preserved effective transmit antennas, $D_{Tx}$; in the outdoor deployment (e.g., graph 710) versus the indoor deployment (e.g., graph 720). The self-interference reduction achieved for each of the 36 transmit antennas is shown in FIG. 7A, along with the self-interference reduction averaged over all 36 transmit antennas. FIG. 7B shows the empirical cumulative distribution function (CDF) of the achieved self-interference reduction, both indoors and outdoors, for a selection of values for the number of effective transmit antennas, $D_{Tx}$ being preserved.

It can be observed in FIG. 7A that, with all 36 effective transmit antennas preserved, the self-interference can be only suppressed (passively) by approximately 20 dB (in both indoor and outdoor deployments). However, by giving up 16 effective transmit antennas and preserving $D_{Tx}=20$ effective antennas for the downlink signaling in the outdoor deployment, the self-interference can be suppressed by more than 50 dB (see the graph 710). It can be also noticed in FIG. 7A, however, that the self-interference reduction in the outdoor deployment (e.g., the graph 710) is better than the self-interference reduction in the indoor deployment (e.g., the graph 720) for the same number of effective antennas, $D_{Tx}$ preserved for downlink signaling. For example, to achieve 50 dB self-interference reduction in the indoor deployment, 24 of the 36 effective transmit antennas may need to be given up leaving $D_{Tx}$=12 for downlink transmission (see the graph 720), as opposed to 16 effective transmit antennas in the outdoor deployment (see the graph 710). The same antenna array is used in both outdoor and indoor environments, the only difference being the backscattering environment.

The reason for better performance in outdoor environments than in indoor environments is that the backscattering present in indoor environments reduces the correlation of the self-interference among antennas that is present in a low scattering environments (i.e., outdoor environments). Less correlation makes it harder to suppress the self-interference at multiple antennas without giving up more effective antennas. More specifically, the self-interference reduction precoder 206, $P_{Self}$ presented herein projects a transmit signal onto $D_{Tx}$ singular vectors corresponding to smallest $D_{Tx}$ singular values. In other words, the self-interference reduction precoder 206, $P_{Self}$ reduces self-interference by avoiding the ($M_{Tx}$–$D_{Tx}$) dominant modes (singular values) of the self-interference channel. In outdoor deployment, direct paths between antennas dominate any backscattered paths, leading to a more correlated self-interference matrix, and hence a large amount of the overall channel power resides in the dominant ($M_{Tx}$–$D_{Tx}$) modes (singular values). Therefore, a significant level of self-interference reduction can be achieved by avoiding first few dominant modes. However, in an indoor environment, multipath backscattering tends to decorrelate a self-interference channel and thus leads to a more uniform distribution of power over the modes (singular values). Therefore, in the indoor environment, a less amount of self-interference can be suppressed by avoiding only the ($M_{Tx}$–$D_{Tx}$) most dominant modes (singular values).

FIG. 7B shows the empirical CDF of the achieved self-interference reduction, both in indoor and outdoor environments, for a selection of values for the number of effective antennas, $D_{Tx}$ preserved for downlink signaling (e.g., CDF plots 732, 734, 736, 738, 740, 742 for $D_{Tx}$=12, 20, 28 in outdoor and indoor environments). It can be observed in FIG. 7B that for small number of effective transmit antennas, $D_{Tx}$ there is much more variation in the achieved self-interference reduction in outdoor deployment than in indoor deployment. For example, for outdoor deployment with $D_{Tx}$=12 (e.g., plot 732), the self-interference reduction for a given antenna can be between 62 dB and 90 dB, which is a difference of 28 dB. However, for the indoor deployment, there is much less variation for level of self-interference reduction. For example, for indoor deployment with $D_{Tx}$=12 (e.g., plot 734), the difference between best and worst self-interference reduction is only approximately 10 dB.

More variation of self-interference reduction in outdoor environments than in indoor environments is also due to less backscattering outdoors than indoors. In outdoor environments, the backscattering is nearly nonexistent and direct paths between transmit and receive antenna dominate even for small number of effective transmit antennas, $D_{Tx}$. The characteristics of the direct-path self-interference channel seen by each receive antenna may vary substantially. For example, a subset of receive antennas that are nearest transmit antennas may notice less correlation among the transmit antennas (because of a smaller angular spread) than another subset of receive antennas farther away from the transmit antennas. In indoor environments, however, for a smaller number of effective transmit antennas, $D_{Tx}$ the self-interference can be dominated by backscattered paths. Unlike direct paths, characteristics of the backscattered paths cause less variation in a self-interference channel seen by each receive antenna. Therefore, for a small number of effective transmit antennas, $D_{Tx}$, it is expected to observe more variation in self-interference reduction over the antenna array in outdoor environments than in indoor environments.

Achievable Rate Gains of Full-Duplex Versus Half-Duplex

Figure 8A:
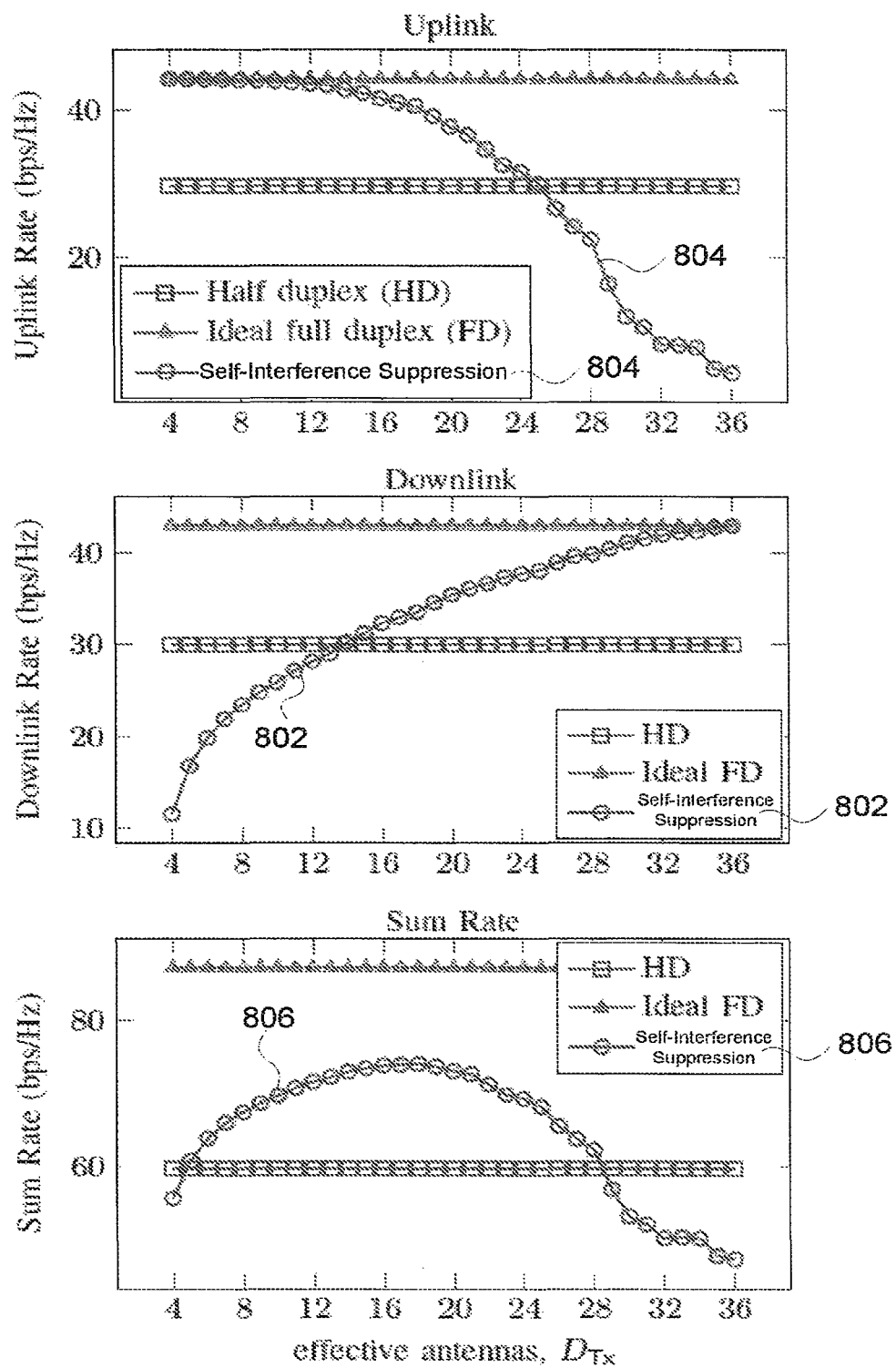
FIGS. 8A-8B illustrate example graphs of achievable rates of a full-duplex system with a precoder for self-interference reduction vs. a half-duplex system, in accordance with embodiments of the present disclosure.
Figure 8B:
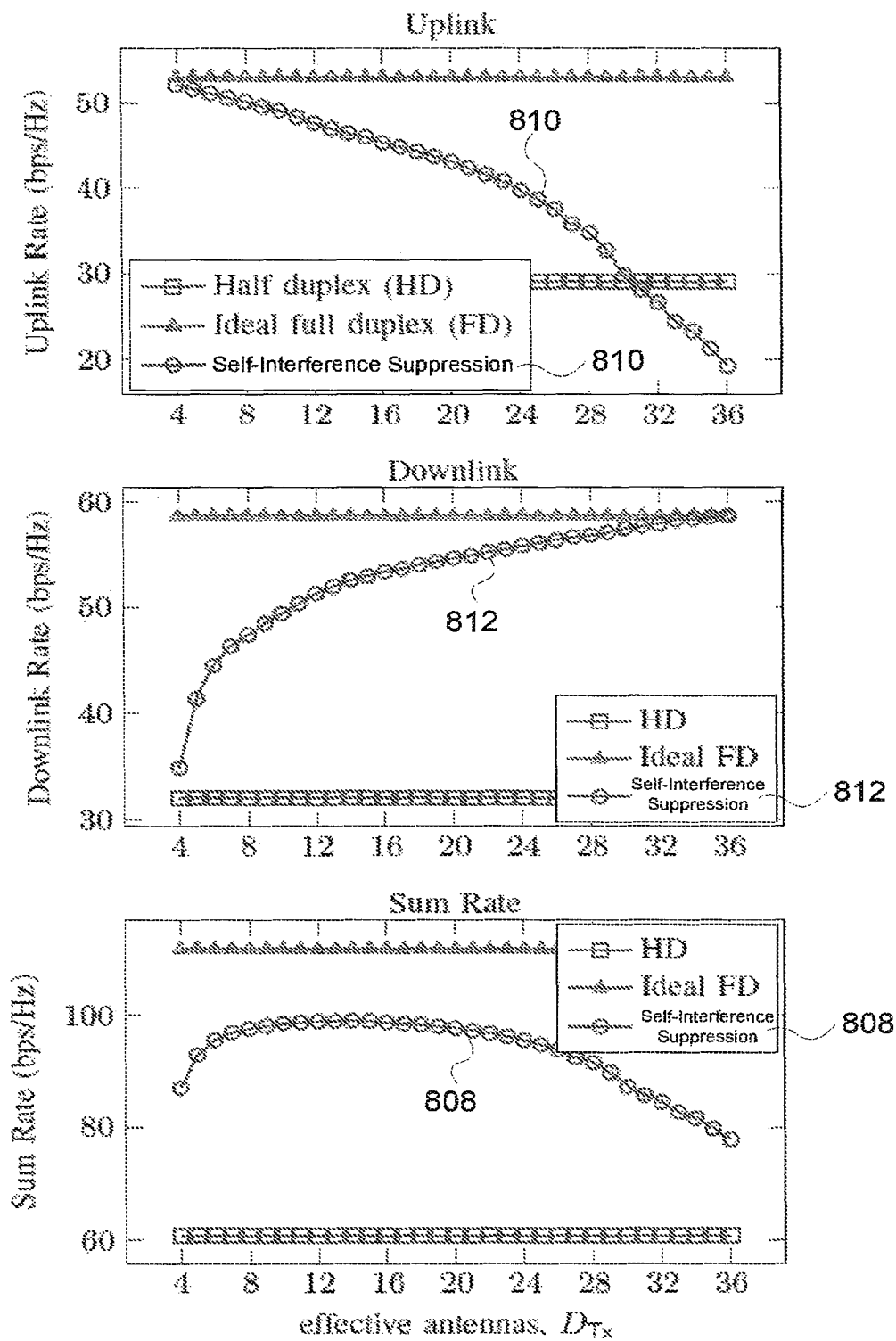

FIGS. 8A-8B show uplink, downlink, and sum rates achieved in full-duplex systems where the self-interference suppression presented herein is employed (i.e., the self-interference reduction precoder 206, $P_{Self}$ illustrated in FIG. 2 and defined by equations (4) and (5)) as a function of a number of preserved effective transmit antennas, $D_{Tx}$. The achievable rates of the self-interference suppression method presented in this disclosure are compared to that of half-duplex system as well as with the theoretically ideal full-duplex system. It is considered in the illustrative embodiment that a number of uplink and downlink clients (users) can be the same and both equal to four, i.e., $K_{Up}$=$K_{Down}$=K=4.

FIG. 8A illustrates performance results (achievable rates) for channels collected in outdoor deployment. The downlink rate achieved by the presented self-interference suppression scheme (see plot 802) increases as a number of preserved effective transmit antennas, $D_{Tx}$ increases, since more effective transmit antennas become available to beamform and thus create an improved signal-to-interference-plus-noise ratio (SINR) to downlink clients. However, as the number of preserved effective transmit antennas, $D_{Tx}$ increases the uplink rate decreases (see plot 804) because the self-interference suppression scheme of the present disclosure can suppress less self-interference when more effective transmit antennas are used for downlink beamforming. It can be observed from FIG. 8A that once the number of preserved effective transmit antennas, $D_{Tx}$ is less than approximately 12, the incremental gain in uplink rate from giving up each additional effective transmit antenna is only negligible (see plot 804). For example, at $D_{Tx}$=12, the self-interference can be sufficiently suppressed to no longer overwhelm the receiver, and digital cancellation (e.g., digital cancellation 208 shown in FIG. 2) can remove remaining self-interference. Reducing the number of effective transmit antennas, $D_{Tx}$ below 12 improves the uplink rate only slightly but greatly decreases the downlink rate (see plot 802 for $D_{Tx}$<12). It can be also observed from FIG. 8A (see sum rate plot 806 representing the sum of uplink rate 804 and downlink rate 802) that there is a range of values for the number of effective transmit antennas, $D_{Tx}$ for which the self-interference suppression scheme of the present disclosure outperforms half-duplex both for the uplink and the downlink signaling. It can be noticed that the self-interference suppression scheme of the present disclosure outperforms half-duplex communication for $D_{Tx} \in$ [5,28], achieving peak performance at $D_{Tx}$=18. For example, the achieved rate at $D_{Tx}$=18 is 23% better than that for half-duplex communication.

FIG. 8B shows performance of the presented self-interference suppression scheme for indoor deployment. It can be observed that in indoor environments the self-interference suppression scheme of the present disclosure outperforms half-duplex communication for all values of the number of effective antennas, $D_{Tx}$ preserved for downlink signaling, with the best performance for $D_{Tx}=14$, for which a 62% gain over half-duplex is achieved (see sum rate plot 808 representing sum of uplink rate 810 and downlink rate 812). At first, it seems surprising that the gains over half-duplex are better indoors than outdoors, when FIG. 7A shows that the self-interference reduction achieved in outdoor environments is better than that achieved in indoor environments. The difference is that the path loss for the channels measured indoors was much less than that measured outdoors. The clients indoors were necessarily placed closer to the array (e.g., 10-25 ft.) because of limited space, but outdoors were placed much farther (e.g., 30-50 ft.). Full-duplex communication always becomes more challenging as path loss increases. Larger path loss means the uplink signal is weaker, and therefore more self-interference reduction is required to make the self-interference commensurate in power to the uplink signal.

For the self-interference suppression scheme of the present disclosure, larger path loss means more effective transmit antennas may need to be given up to achieve better self-interference reduction. Larger path loss also means that more effective transmit antennas are needed to achieve sufficient signal strength on the downlink. Therefore, the cost of using effective transmit antennas for the sake of reducing self-interference becomes greater. Because the path loss was greater in the outdoor deployment than the indoor deployment, the gains of the self-interference suppression scheme presented herein are less for the outdoor deployment than for the indoor deployment. Even though the achieved self-interference is better outdoors than indoors, the benefit of better suppression does not compensate for the greater path loss.

The self-interference suppression scheme presented in this disclosure enables full-duplex operation with current base station radios without requiring additional circuitry for analog cancellation. The presented self-interference suppression scheme is based on that the self-interference need not be perfectly nulled; it is only needed to sacrifice a minimal number of effective antennas required to sufficiently suppress the self-interference. It is shown in the present disclosure that sufficient level of self-interference reduction can be achieved while only using a portion of effective transmit antennas for self-interference suppression.

Large Scale Beamforming with Full Duplex

Disclosed embodiments further include methods to combine large scale beamforming with full duplex. In some embodiments, large scale beamforming can be implemented at a many-antenna base station (e.g., the many-antenna base station 102 illustrated in FIG. 1) where transmission/reception over narrow beams of space can be performed by a large number of transmit/receive antennas of the many-antenna base station. The beamforming can provide approximately M-fold power gain, where M is a number of antennas used for beamforming at the many antenna base station. In addition, multi-user beamforming (MUBF) can provide spatial multiplexing since data dedicated to different users can be transmitted over different (e.g., mutually non-overlapping) regions (e.g., beams) of space. In some embodiments, when scaling up a number of antennas at the many-antenna base station, a naturally narrow beam can mitigate self-interference since transmission and reception can be achieved within the narrow beam of space.

Figure 9:
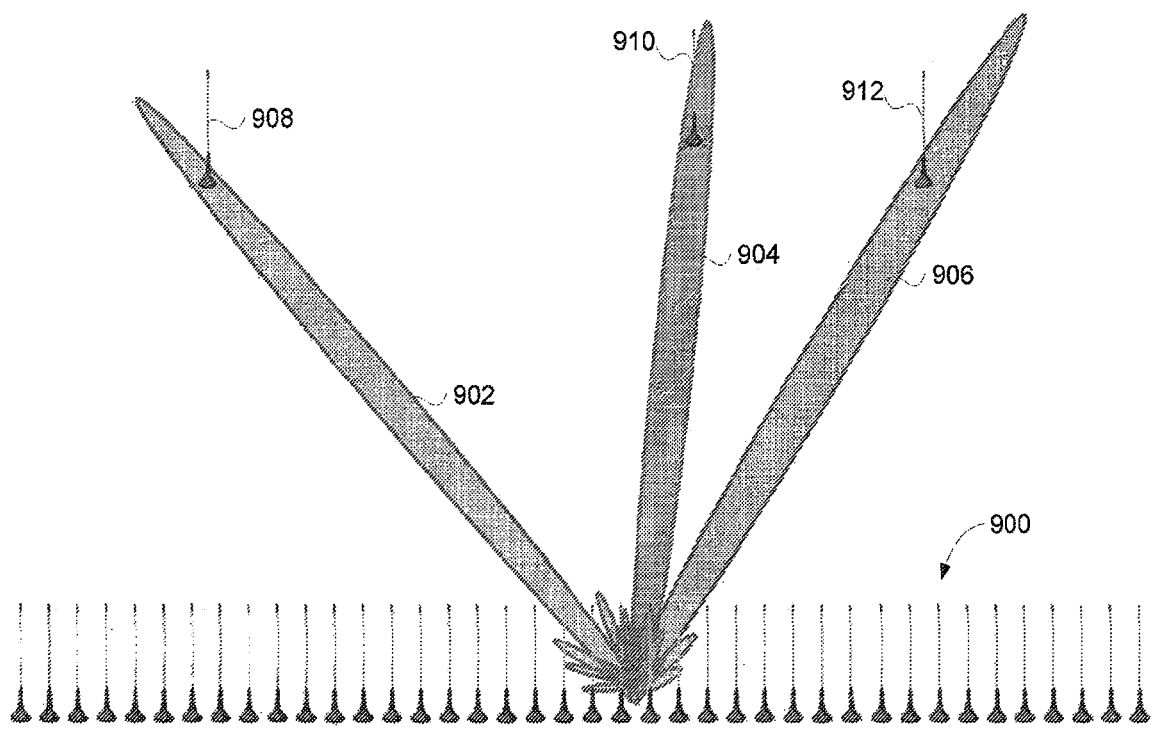
FIG. 9 illustrates an example of large scale beamforming, in accordance with embodiments of the present disclosure

FIG. 9 illustrates an example of large scale beamforming, in accordance with embodiments of the present disclosure. Beam patterns 902, 904 and 906 are transmitted from an antenna array 900 of a many-antenna base station, such as the many-antenna base station 102 illustrated in FIG. 1. As illustrated in FIG. 9, each of beam patterns 902, 904 and 906 is transmitted over a narrow region (beam) of space to a different user terminal 908, 910, 912, respectively. In this way, by transmitting (and receiving) data over narrow beams of space, self-interference at the antenna array 900 can be further mitigated.

In some embodiments, as discussed, a number of antennas at a many-antenna base station (e.g., the many-antenna base station 102 illustrated in FIG. 1) can be scaled up. More antennas at the many-antenna base station leads to more directionality and to increased power gain. Furthermore, transmit antennas of the many-antenna base station can naturally become orthogonal to receive antennas of the many-antenna base station, regardless of the placement of transmit/receive antennas. Thus, by scaling up the number of antennas at the many-antenna base station, transmission can be performed efficiently with less power per transmit antenna, reception can be achieved with more receive power, and less of power that is transmitted may interfere with receivers of the many-antenna base station.

By scaling up the number of antennas at the many-antenna base station, a self-interference power at the base station and an inter-terminal interference between active users served by the many-antenna base station can be set to provide a preferred level of capacity (e.g., preferred information data throughput) of a full duplex wireless system comprising the base station and the active users. In some embodiment, the self-interference power and the inter-terminal interference can be balanced such that to be approximately the same. In some embodiments, the balancing of the self-interference power and the inter-terminal interference can be achieved by adding more antennas at the base station, changing transmission powers at the base station and the active users, and/or changing passive antenna isolation at the base station. The passive antenna isolation can be modified, for example, by changing polarity, absorption, reflection, distance and/or directivity of the base station antennas. When the interference at both sides of the full duplex communication link are balanced (e.g., approximately the same), identical interference cancellation components can be used both at the base station and the user terminals. Thus, in some embodiments, the self-interference reduction precoder 206, $P_{Self}$ and the digital cancellation unit 208 illustrated in FIG. 2 can be implemented at the user terminals. In addition, identical radio frequency (RF) components (e.g., power amplifiers, down-converters, analog-to-digital converters, etc.) can be employed at each antenna of the many-antenna base station and at each user terminal.

For some embodiments, large scale beamforming can be implemented in channel state information (CSI) limited regime, i.e., CSI should be estimated based on limited pilot transmission. Even in half-duplex system, every additional pilot transmission can result in additional multiplex stream. Since full duplex communication causes a lower quality channel than in comparison with half-duplex communication, there is no benefit of using additional pilot slot(s) in full duplex systems. In some embodiments, existing uplink pilots designed for lower scale systems (e.g., half duplex systems) can be used in the case of large scale beamforming with full duplex. In one or more embodiments, circulator circuitry can be employed at a user terminal communicating with a many-antenna base station for separating downlink reception and uplink transmission as well as separating pilot transmission dedicated to transmit and receive antennas of the many-antenna base station. On the other hand, the many-antenna base station does not require a circulator since transmit and receive antenna arrays can be vastly separated at the many-antenna base station.

Figure 10A:
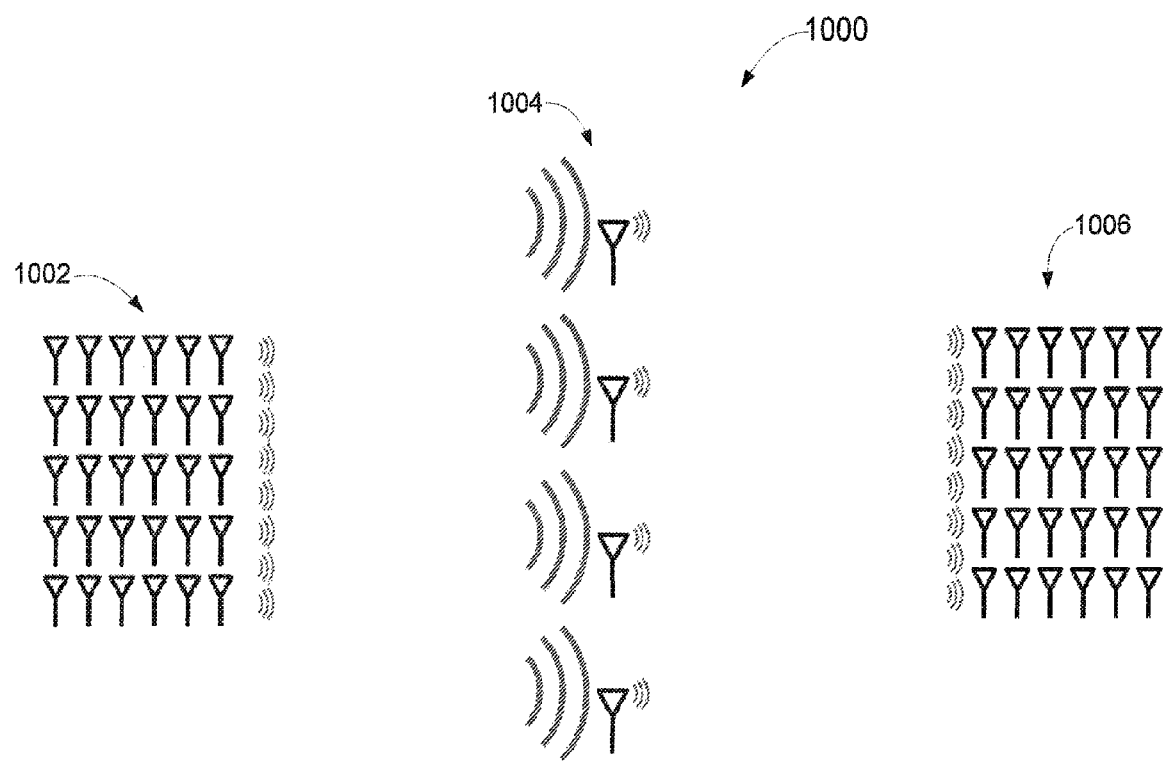
FIG. 10A illustrates an example full duplex communication between a large scale many-antenna base station and user terminals, in accordance with embodiments of the present disclosure.

FIG. 10A illustrates an example 1000 of full duplex communication between a large scale many-antenna base station and user terminals, in accordance with embodiments of the present disclosure. As illustrated in FIG. 10A, a transmit antenna array 1002 of the base station may communicate (e.g., via downlink channels) with a plurality of user terminals 1004. It can be observed in FIG. 10A that a smaller transmit power per base station's antenna of the transmit antenna array 1002 can result into a larger receive power at each user terminal 1004. As further illustrated in FIG. 10A, the plurality of user terminals simultaneously communicate (e.g., via uplink channels) with a receive antenna array 1006 of the many-antenna base station, thus providing full duplex communication. It can be also observed in FIG. 10A that a smaller transmit power per user terminal 1004 can be sufficient to have efficient uplink communication with the receive array 1006. In one or more embodiments, each user terminal 1004 may comprise a circulator to separate uplink and downlink communication on a single user terminal antenna. In some embodiments, as discussed, the transmit antenna array 1002 of the many-antenna base station may employ transmit beamforming, i.e., transmission to different user terminals 1004 over different (e.g., mutually non-overlapping) narrow regions (e.g., beams) of space. Similarly, the receive antenna array 1006 of the many-antenna base station may utilizing receive beamforming, i.e., reception from different user terminals 1004 over different (e.g., mutually non-overlapping) narrow regions (e.g., beams) of space. It should be noted that the transmit antenna array 1002 and the receive antenna array 1006 are physically separated although located at the same many-antenna base station. In some embodiments, as discussed, by employing the large scale beamforming based on communication with intended users over narrow beams of space, a level of self-interference at the many-antenna base station can be substantially reduced, and the level of self-interference at the many-antenna base station can be approximately same as a level of inter-terminal interference between the intended users.

In some embodiments, the transmit antenna array 1002 and the receive antenna array 1006 are RF isolated from each other using any combination of traditional passive cancellation techniques such as physical separation, RF absorption material, directional antennas and polarization. As discussed, additional isolation can be provided automatically by the beamforming gain, which is a function of the number of antennas on both the transmit antenna array 1002 and the receive antenna array 1006. In some embodiments, further isolation between the transmit antenna array 1002 and the receive antenna array 1006 and mitigation of self-interference can be achieved by implementing the self-interference reduction precoder 206, $P_{Self}$ illustrated in FIG. 2 and defined by equations (4) and (5) at the transmit antenna array 1006 and the digital cancellation unit 208 at the receive antenna array 1006.

Figure 10B:
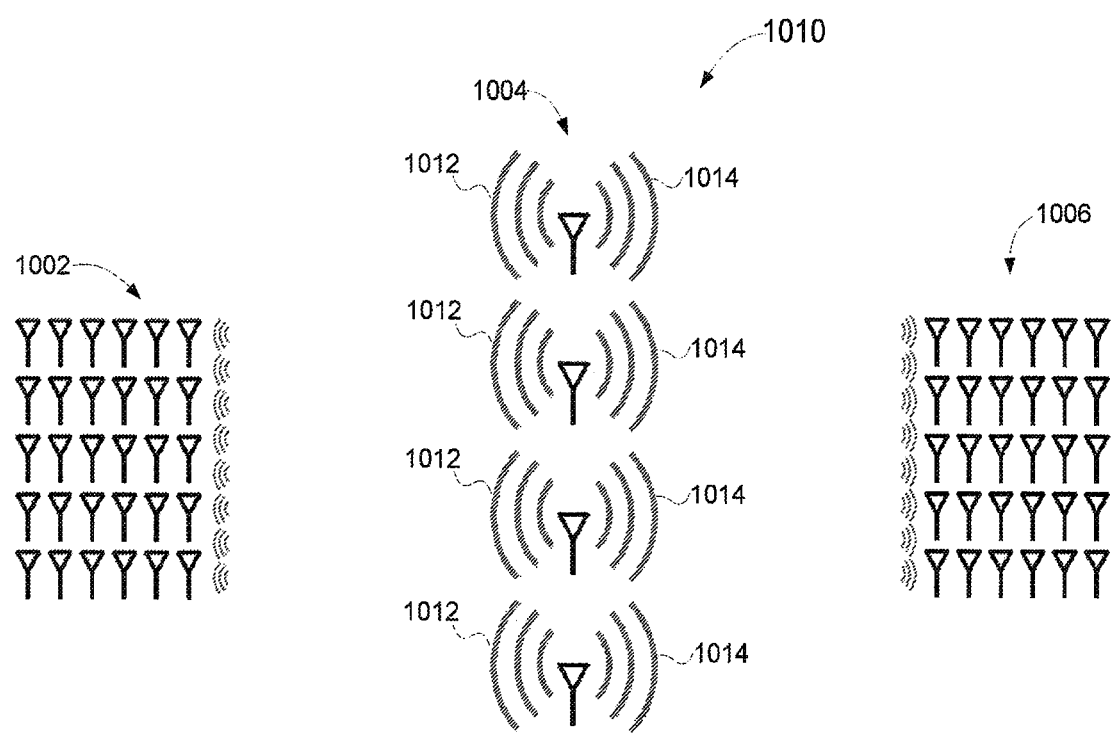
FIG. 10B illustrates an example of channel state information (CSI) collection in full duplex system, in accordance with embodiments of the present disclosure.

FIG. 10B illustrates an example 1010 of CSI collection in full duplex system, in accordance with embodiments of the present disclosure. In some embodiments, a high-power orthogonal pilots 1012 can be transmitted from each user terminal 1004 to the transmit antenna array 1002 for CSI estimation related to downlink channels between the transmit antenna array 1002 and the user terminals 1004. In the same time, each user terminal 1004 can transmit high-power orthogonal pilots 1014 (that can be the same as pilots 1012) to the receive antenna array 1006 of the many-antenna base station for CSI estimation related to uplink channels between the user terminals 1004 and the receive antenna array 1006. In this way, a single pilot sequence spread by orthogonal spreading codes can be employed at each user terminal 1004 to estimate at least one of uplink channels, downlink channels, a self-interference channel of the many-antenna base station, or interference to other user terminals. In an embodiment, the pilot sequence may comprise a TDMA based pilot. Thus, no additional pilot slots are necessary, which results into a limited number of multiplex streams.

Figure 11:
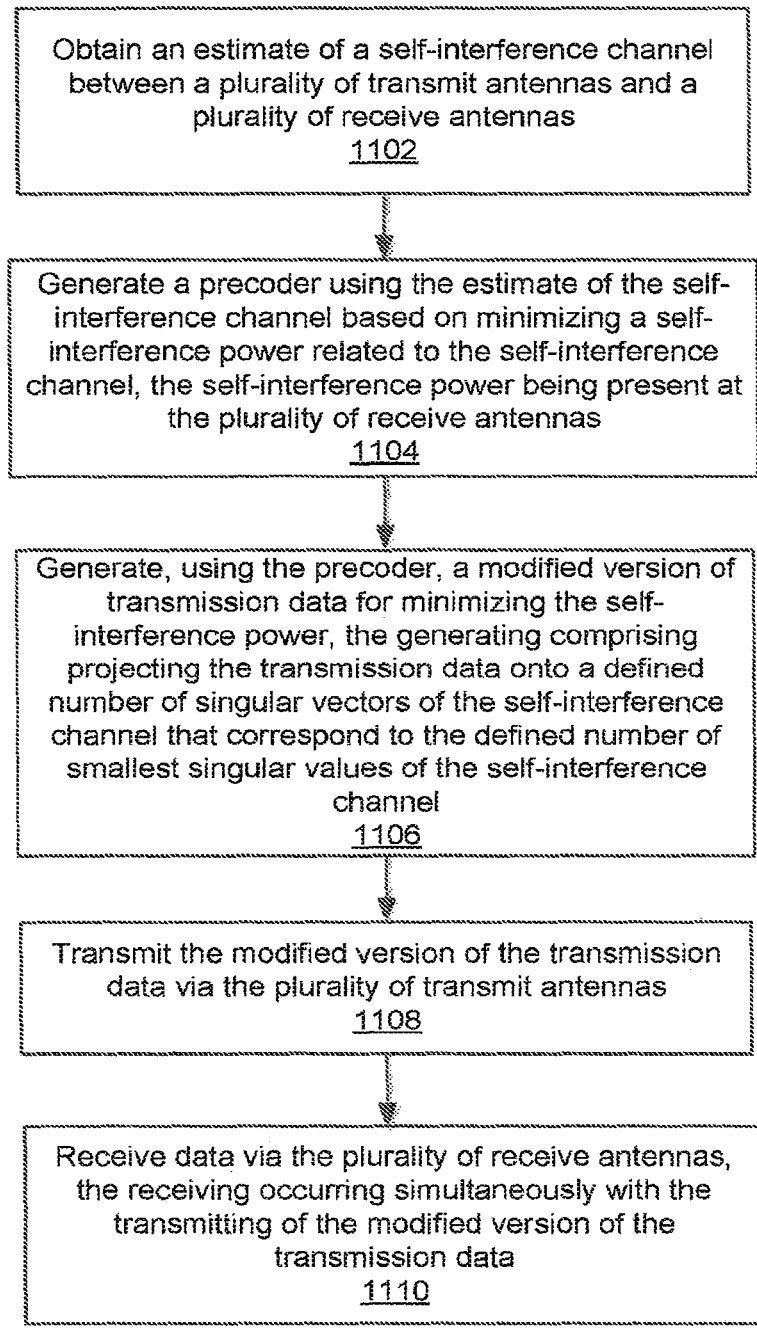
FIG. 11 is a flow chart illustrating a method that may be performed at a many-antenna base station of a multi-user full-duplex wireless communication system, in accordance with embodiments of the present disclosure.

FIG. 11 is flow chart illustrating a method 1100 for self-interference reduction that may be performed at a many-antenna base station (e.g., at the many-antenna base station 102 illustrated in FIG. 1) of a multi-user full-duplex wireless communication system (e.g., the full-duplex system 100 illustrated in FIG. 1), in accordance with embodiments of the present disclosure.

Operations of the method 1100 begin by obtaining 1102 an estimate of a self-interference channel (e.g., channel $H_{Self}$) between a plurality of transmit antennas (e.g., $M_{Tx}$ antennas) and a plurality of receive antennas (e.g., $M_{Rx}$ antennas).

A precoder (e.g., the self-interference reduction precoder 206, $P_{Self}$ illustrated in FIG. 2) is generated 1104 using the estimate of the self-interference channels based on minimizing a self-interference power related to the self-interference channel. The self-interference power is present at the plurality of receive antennas in a form of a residual self-interference within a signal received at the receive antennas of the many-antenna base station or at the receive antennas of one or more interfering wireless devices. In some embodiments, the precoder is generated 1104 as discussed above in accordance with equations (4) and (5).

A modified version of transmission data for minimizing the self-interference power is generated 1106 using the precoder (e.g., the self-interference reduction precoder 206, $P_{Self}$ illustrated in FIG. 2) by projecting the transmission data onto a defined number of singular vectors of the self-interference channel that correspond to the defined number of smallest singular values of the self-interference channel. In some embodiments, as discussed, the defined number of singular vectors of the self-interference channel and the defined number of smallest singular values of the self-interference channel may correspond to the number of effective transmit antennas $D_{Tx}$. In some embodiments, the defined number of smallest singular values of the self-interference channel can be defined according to equation (5).

The modified version of the transmission data is transmitted 1108 via the plurality of transmit antennas (e.g., $M_{Tx}$ antennas).

Data is received 1110 via the plurality of receive antennas (e.g., $M_{Rx}$ antennas), the receiving occurring simultaneously with the transmitting of the modified version of the transmission data via the plurality of transmit antennas (e.g., $M_{Tx}$ antennas), thus achieving full-duplex communication with minimized level of self-interference.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Disclosed embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Disclosed embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for wireless communications, comprising:
   obtaining an estimate of a self-interference channel between a plurality of transmit antennas and a plurality of receive antennas;
   generating a self-interference reduction precoder ($P_{self}$) using the estimate of the self-interference channel based on minimizing a self-interference power related to the self-interference channel, the self-interference power being present at the plurality of receive antennas, wherein said self-interference reduction precoder ($P_{self}$) based on minimizing self-interference power, is defined as:

$$P_{Self} = \underset{P}{\operatorname{argmin}} \|H_{Self} P\|_F^2, \text{ subject to } P^H P = I_{D_{Tx} \times D_{Tx}},$$

wherein $P_{self}$ is a $M_{Tx} \times D_{Tx}$ matrix representing the precoder, $H_{Self}$ is a matrix representing the estimate of the self-interference channel, $D_{Tx}$ is the defined number of singular vectors, and $\|\cdot\|_F^2$ is the squared Frobenius norm, measuring the total self-interference power; generating, using said precoder ($P_{Self}$), a modified version of transmission data for minimizing the self-interference power, the generating comprising projecting the transmission data onto a defined number of singular vectors of the self-interference channel that correspond to the defined number of smallest singular values of the self-interference channel;
   transmitting the modified version of the transmission data via the plurality of transmit antennas; and
   receiving data via the plurality of receive antennas, the receiving occurring simultaneously with the transmitting of the modified version of the transmission data.

2. The method of claim 1, wherein the generated precoder comprises a defined number of $D_{Tx}$ orthonormal columns ensuring that $D_{Tx}$ effective antennas are preserved for efficient MU-MIMO downlink signaling.

3. The method of claim 1, wherein the modified version of the transmission data are projected when being transmitted via the plurality of transmit antennas onto the defined number of left singular vectors of the self-interference channel.

4. The method of claim 1, further comprising:
   processing the received data to cancel an interference of the modified version of the transmission data into the received data, the interference having the self-interference power being minimized.

5. The method of claim 4, wherein processing the received data to cancel the interference is based on digital cancellation.

6. The method of claim 1, further comprising:
   estimating an effective downlink channel created by operating the precoder on a downlink channel;
   generating a second precoder based on the estimated effective downlink channel; and
   precoding transmission symbols using the second precoder to generate the transmission data for the precoder,
   wherein the second precoder comprises a minimum mean square error (MMSE) based beamforming.

7. The method of claim 1, further comprising:
partitioning an antenna array into the plurality of transmit antennas and the plurality of receive antennas to reduce the self-interference power below a defined threshold.

8. The method of claim 1, further comprising:
receiving, at the plurality of receive switched transmit antennas of a base station, first orthogonal pilots transmitted from a plurality of user terminals;
receiving, at the plurality of receive antennas of a base station, second orthogonal pilots transmitted from the plurality of user terminals; and
estimating at least one of uplink channels between a base station and the plurality of user terminals, downlink channels between a base station and the plurality of user terminals, self-interference channels, or interference related to user terminals, based on the first and second orthogonal pilots, wherein user terminals are either (1) user terminals controlled by a network associated with the many-antenna base station or (2) user terminals not controlled b the network or the many-antenna base station.

9. The method of claim 1, wherein:
switching of said transmitter from transmitter to receiver is further configured to switch the plurality of transmit antennas into a receive mode;
listening, via said plurality of transmit antennas in the receive mode, for one or more signals transmitted from one or more interfering antennas;
receiving interference from antennas that are either controlled by a network associated with the many-antenna base station or not controlled by a network associated with the many-antenna base station; and
estimating self-interference or interference channels from the one or more interfering antennas and apply the method of claim 1 to reduce interference.

10. An apparatus for wireless communications, comprising:
an estimator configured to obtain an estimate of a self-interference channel between a plurality of transmit antennas at the apparatus and a plurality of receive antennas;
a circuit configured to generate a precoder using the estimate of the self-interference channel based on minimizing a self-interference power related to the self-interference channel, the self-interference power being present at the plurality of receive antennas;
said circuit configured to generate a precoder based on minimizing the self-interference power computes:

$$P_{Self} = \underset{P}{\operatorname{argmin}} \|H_{Self} P\|_F^2, \text{ subject to } P^H P = I_{D_{Tx} \times D_{Tx}},$$

where $P_{Self}$ is a $M_{Tx} \times D_{Tx}$ matrix representing the precoder, $H_{Self}$ is a matrix representing the estimate of the self-interference channel, $D_{Tx}$ is the defined number of singular vectors, and $\|\cdot\|_F^2$ is the squared Frobenius norm, measuring the total self-interference power;
the precoder configured to generate a modified version of transmission data for minimizing the self-interference power by projecting the transmission data onto a defined number of singular vectors of the self-interference channel that correspond to the defined number of smallest singular values of the self-interference channel; and
a transmitter configured to transmit the modified version of the transmission data via the plurality of transmit antennas, wherein
receiving data via the plurality of receive antennas occurs simultaneously with the transmitting the modified version of the transmission data from the transmitter.

11. The apparatus of claim 10, wherein the modified version of the transmission data are projected when being transmitted via the plurality of transmit antennas onto the defined number of left singular vectors of the self-interference channel.

12. The apparatus of claim 10, further comprising a receiver configured to:
process the received data to cancel an interference of the modified version of the transmission data into the received data, the interference having the self-interference power being minimized.

13. The apparatus of claim 12, wherein the receiver comprises a digital cancellation circuit configured to process the received data to cancel the interference.

14. The apparatus of claim 10, wherein:
the estimator is further configured to estimate an effective downlink channel created by operating the precoder on a downlink channel; and
the circuit is further configured to generate a second precoder based on the estimated effective downlink channel, and wherein
the second precoder is configured to precode transmission symbols to generate the transmission data for the precoder.

15. The apparatus of claim 10, further comprising:
a processor configured to determine a partition of an antenna array at the apparatus into the plurality of transmit antennas and the plurality of receive antennas to reduce the self-interference power below a defined threshold.

16. The apparatus of claim 10, further comprising a receiver, wherein:
the transmitter is further configured to switch to a receive mode of operation and receive signals transmitted from one or more wireless devices, via the plurality of RF switched transmit antennas, first orthogonal pilots transmitted from a plurality of user terminals;
the receiver is configured to receive, via the plurality of receive antennas, second orthogonal pilots transmitted from the plurality of user terminals; and
the estimator is further configured to estimate at least one of uplink and downlink channels between the apparatus and the plurality of user terminals, the self-interference channel, or interference related to user terminals, based on the first and second orthogonal pilots, wherein user terminals may be controlled by a network associated with the many-antenna base station or not controlled by a network associated with the many-antenna base station.

17. The apparatus of claim 10, wherein a number of antennas employed at the apparatus causes further reduction of the self-interference power, and wherein the self-interference power and an inter-terminal interference between a pair of user terminals communicating with the apparatus in accordance with full duplex communication are set to provide a defined capacity of the full duplex communication.

18. The apparatus of claim 10, wherein:
the transmitter is further configured to transmit pilots from the plurality of transmit antennas; and the estimator is configured to obtain the estimate of the self-interference channel based on the pilots received at the plurality of receive antennas.

19. The apparatus of claim 10, wherein:

the transmitter is further configured to switch the plurality of transmit antennas into a receive mode;

the plurality of transmit antennas in the receive mode are configured to listen for one or more signals transmitted from one or more interfering antennas;

said interfering antennas either controlled by a network associated with the many-antenna base station or not controlled by a network associated with the many-antenna base station; and the estimator is further configured to estimate the interference channel to the one or more interfering antennas and apply the apparatus of claim 10 to reduce interference.

* * * * *